(12) United States Patent
Rasp et al.

(10) Patent No.: US 11,312,382 B2
(45) Date of Patent: Apr. 26, 2022

(54) USE OF COST MAPS AND CONVERGENCE MAPS FOR LOCALIZATION AND MAPPING

(71) Applicant: Robert Bosch GmbH, Stuttgart (DE)

(72) Inventors: Philipp Rasp, Wannweil (DE); Carsten Hasberg, Ilsfeld-Auenstein (DE); Muhammad Sheraz Khan, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/075,514

(22) Filed: Oct. 20, 2020

(65) Prior Publication Data

US 2021/0129848 A1 May 6, 2021

(30) Foreign Application Priority Data

Nov. 6, 2019 (DE) .......................... 102019217147.8

(51) Int. Cl.
| | |
|---|---|
| *B60W 40/02* | (2006.01) |
| *G06T 11/20* | (2006.01) |
| *G06V 10/40* | (2022.01) |
| *G06V 10/46* | (2022.01) |
| *G06V 10/75* | (2022.01) |
| *G06V 20/56* | (2022.01) |

(52) U.S. Cl.
CPC ............. *B60W 40/02* (2013.01); *G06V 10/46* (2022.01); *B60W 2420/42* (2013.01); *B60W 2420/52* (2013.01); *B60W 2556/35* (2020.02); *G06V 10/476* (2022.01); *G06V 10/513* (2022.01)

(58) Field of Classification Search
None
See application file for complete search history.

(56) References Cited

U.S. PATENT DOCUMENTS

| | | | | |
|---|---|---|---|---|
| 10,823,562 | B1* | 11/2020 | Carnahan | ........... G01C 21/3804 |
| 10,901,431 | B1* | 1/2021 | Ebrahimi Afrouzi | ..... G06T 7/73 |
| 10,928,830 | B1* | 2/2021 | Tran | ................... G06K 9/00791 |
| 11,137,752 | B2* | 10/2021 | Cella | .................. G05B 23/0294 |
| 2015/0287422 | A1* | 10/2015 | Short | .................... G01S 13/723 |
| | | | | 704/205 |
| 2017/0347110 | A1* | 11/2017 | Wang | .................... G06T 3/4046 |
| 2018/0188043 | A1* | 7/2018 | Chen | .................... G05D 1/0088 |

(Continued)

FOREIGN PATENT DOCUMENTS

| | | |
|---|---|---|
| DE | 102014221888 A1 | 4/2016 |
| DE | 102015225577 A1 | 6/2017 |

*Primary Examiner* — Soo Shin
(74) *Attorney, Agent, or Firm* — Norton Rose Fulbright US LLP; Gerard Messina

(57) ABSTRACT

A method for ascertaining features in an environment of at least one mobile unit for implementation of a localization and/or mapping by a control unit. In the course of the method, sensor measurement data of the environment are received, the sensor measurement data received are transformed by an alignment algorithm into a cost function and a cost map is generated with the aid of the cost function, a convergence map is generated based on the alignment algorithm. At least one feature is extracted from the cost map and/or the convergence map and stored, the at least one feature being provided in order to optimize a localization and/or mapping. A control unit, a computer program, and a machine-readable storage medium are also described.

7 Claims, 7 Drawing Sheets

(56) References Cited

U.S. PATENT DOCUMENTS

2020/0011668 A1\* 1/2020 Derhy .................. G01C 21/206
2021/0089040 A1\* 3/2021 Ebrahimi Afrouzi ........................
                                           A47L 9/2894

\* cited by examiner

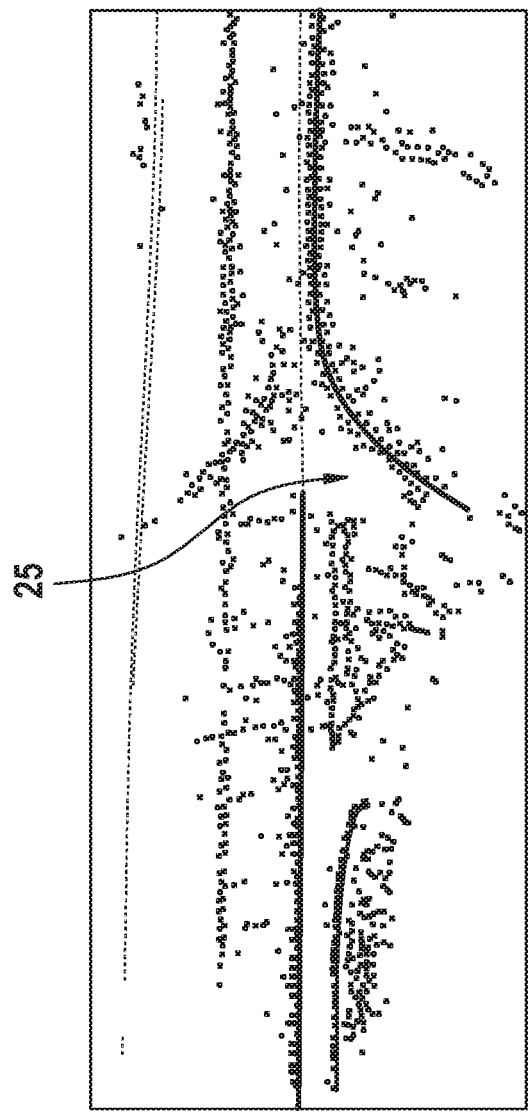
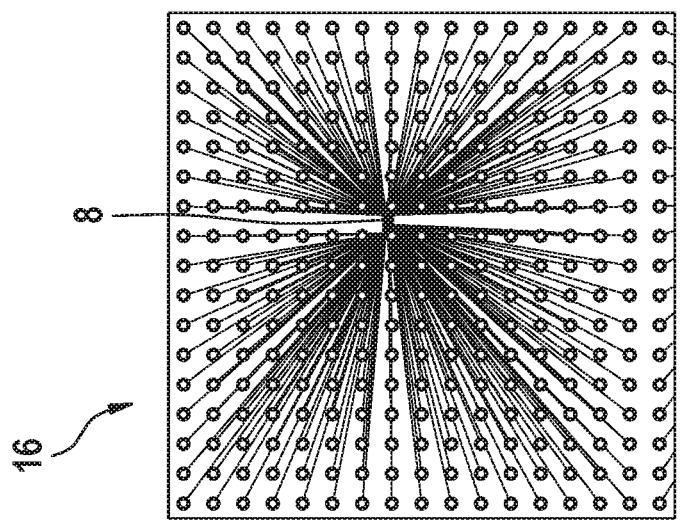
FIG. 9
FIG. 8

USE OF COST MAPS AND CONVERGENCE MAPS FOR LOCALIZATION AND MAPPING

CROSS REFERENCE

The present application claims the benefit under 35 U.S.C. § 119 of German Patent Application No. DE 102019217147.8 filed on Nov. 6, 2019, which is expressly incorporated herein by reference in its entirety.

FIELD

The present invention relates to a method for ascertaining features in an environment of at least one mobile unit, for implementation of a localization and/or mapping by a control unit. In addition, the present invention relates to a control unit, a computer program as well as a machine-readable storage medium.

BACKGROUND INFORMATION

Vehicles having automated driving functions are becoming increasingly important in road traffic. In particular, such vehicles have the potential to prevent traffic tie-ups and accidents due to human error. Robust localization functions as well as precise mapping of the environment are necessary for the successful implementation of automated driving functions.

To create maps for carrying out automated driving functions, features are extracted from the environment and stored in a digital map. In particular, unique or outstanding features may be useful for a subsequent localization within the digital map. For example, such unique features may be traffic signs, non-recurrent structures or towers. In addition, there are many features which repeat periodically. The repeating features may be formed, e.g., by traffic-lane markings or reflector posts. However, it is problematic that the extraction or the use of repetitive features may lead to ambiguities in the mapping or localization.

SUMMARY

An object of the present invention includes providing a method for extracting additional qualitative and quantitative features for use in a mapping and/or localization.

This object may be achieved with the aid of example embodiments of the present invention. Advantageous developments of the present invention are described herein.

According to one aspect of the present invention, a method is provided for ascertaining features in an environment of at least one mobile unit, for implementation of a localization and/or mapping by a control unit. In accordance with an example embodiment of the present invention, in one step, sensor measurement data of an environment are received. Alternatively or additionally, already processed map data may also be received.

Based on the sensor measurement data received, an alignment algorithm is generated. A cost function represents a part of the alignment algorithm and is specified. A cost map is then generated with the aid of the cost function. For example, the cost map may be formed as a discrete cost function. The cost map may be created based on the sensor measurement data which were ascertained by an environment sensor system of the mobile unit.

A convergence map is then generated based on the alignment algorithm. In contrast to the cost map, the convergence map represents a multitude of trajectories which the alignment algorithm follows in response to different initial conditions. The initial conditions or starting conditions of the alignment algorithm relate here to different positions and orientations of the mobile unit. The cost map thus illustrates the properties of the cost function and the convergence map illustrates the properties of the alignment algorithm.

In a further step, at least one feature is ascertained from the cost map and/or the convergence map and stored. The at least one feature is provided in order to optimize a localization and/or mapping. In this case, the at least one feature may be an occurrence of one or more minima in the cost map and/or the convergence map.

One main aspect during the map-creation process is the ability to extract ambiguous and/or unambiguous regions or features automatically and to use this additional information during the map creation or localization. By using cost maps and convergence maps, additional functions may be determined which are necessary for the expansion of features utilized in digital maps.

Preferably, cost maps and or convergence maps may be generated from sensor measurement data of video sensors or camera sensors, stereo camera sensors, three-dimensional camera sensors, 360° camera arrays, LIDAR sensors, radar sensors, ultrasonic sensors and the like. In addition, sensor measurement data from various sources may be combined together or amalgamated, in order to create a combined cost map and/or convergence map.

Alignment algorithms may be used which are based on iterative or gradual methods. For example, such alignment algorithms may take the form of what are referred to as iterative closest point algorithms or gradual algorithms.

In particular, the cost map and the convergence map may be regarded as compressed representations of the actual sensor measurement data. For instance, this compressed representation may be realized by a number of minima within the maps, which are usable as additional features of the maps and by a localization unit during operation of the mobile unit. These features may be utilized, e.g., to limit a localization unit for ascertaining a position of the mobile unit within a digital map, to one region in which the convergence map has an unambiguous minimum. In regions in which the minima have a periodic character, the localization unit may use a targeted strategy. For example, the localization unit may focus the calculations on regions with lower cost values of the cost map, which are observed in the cost map and/or convergence map.

According to a further aspect of the present invention, a control unit is provided, the control unit being equipped to carry out the method. For example, the control unit may be a control unit disposed in the mobile unit or may be an external control unit. The control unit may be connectable to a control of the mobile unit for carrying out automated driving functions, for instance, or may be integrated into such a control. For example, an external control unit may be an off-board server unit which is based on a cloud technology.

In addition, according to one aspect of the present invention, a computer program is provided that includes commands which, upon execution of the computer program by a computer or a control unit, cause it to carry out the method of the present invention. According to a further aspect of the present invention, a machine-readable storage medium is provided, on which the computer program according to the present invention is stored.

In this case, the mobile unit may be operable in assisted, partially automated, highly automated and/or fully automated or driverless fashion in accordance with the Federal Highway Research Institute standard. In particular, the mobile unit may take the form of a vehicle such as a passenger car, for instance, bus, commercial vehicle, truck or the like. In addition, the mobile unit may be in the form of a robot, a drone, a helicopter, an airplane, a watercraft, a shuttle, a robo taxi and the like.

According to one exemplary embodiment of the present invention, a number of minima is extracted as at least one feature from the cost map and/or the convergence map. The cost map and/or the convergence map may thus be considered as compressed representation of the sensor measurement data. The cost function is a function which is defined by a user or an application case, and which is based on a position of the mobile unit and the received sensor measurement data. In the context of a mapping, the cost function defines how precisely the sensor measurement data of different trips agree with each other in the case of a given position of the mobile unit. For instance, this may be used in an alignment of sensor measurement data of various trips. In the context of a localization, the cost function defines how precisely the sensor measurement data agree with an existing map in the case of a given position of the mobile unit.

The convergence map relates to the underlying properties of alignment algorithms used, which are based on iterative or gradual methods, and defines the trajectories in the so-called pose space of an alignment algorithm which start out from different initial conditions. For example, the initial conditions may also include the positions of the mobile unit.

According to a further specific embodiment of the present invention, periodically occurring features are ascertained via a plurality of detected minima, and features occurring one time are ascertained via a single minimum in the cost map and/or the convergence map. Owing to this measure, the number of minima ascertained is able to provide an indication as to whether the extracted features are periodic or repetitious, or are unique, that is, appear one time. For example, the features represented by the minima of the cost map may repeat temporally or spatially.

According to a further specific embodiment of the present invention, the cost function is utilized to generate a two-dimensional or three-dimensional cost map. Due to this measure, cost maps with varying degrees of distinctness may be used depending on the computing power and memory available. Thus, the cost function ascertained by the alignment algorithm may be determined in different directions in space and stored in a memory.

According to a further exemplary embodiment of the present invention, a sharpness and/or a form of the cost map is/are extracted and utilized for processing the sensor measurement data. In particular, the sharpness or slope of the cost function may be ascertained in the area of the minimum or minima. A form of the minima represented in the cost map may be utilized, for instance, to limit preprocessing steps in the mapping or localization such as, e.g., cluster formation or simulation of environmental influences.

According to another specific embodiment of the present invention, differences are determined between the minima ascertained in the cost map. The differences determined in the form and the value of the various local minima may thus be extracted as further features and stored.

Preferred exemplary embodiments of the present invention are explained hereinafter in greater detail on the basis of highly simplified schematic representations.

BRIEF DESCRIPTION OF THE DRAWINGS

FIG. 8 shows a further schematic convergence map which reflects a feature occurring one time in accordance with an example embodiment of the present invention.

FIG. 9 shows schematic representation of sensor measurement data of a radar sensor which are used to create the convergence map in FIG. 8 in accordance with an example embodiment of the present invention.

DETAILED DESCRIPTION OF EXAMPLE EMBODIMENTS

Figure 1:
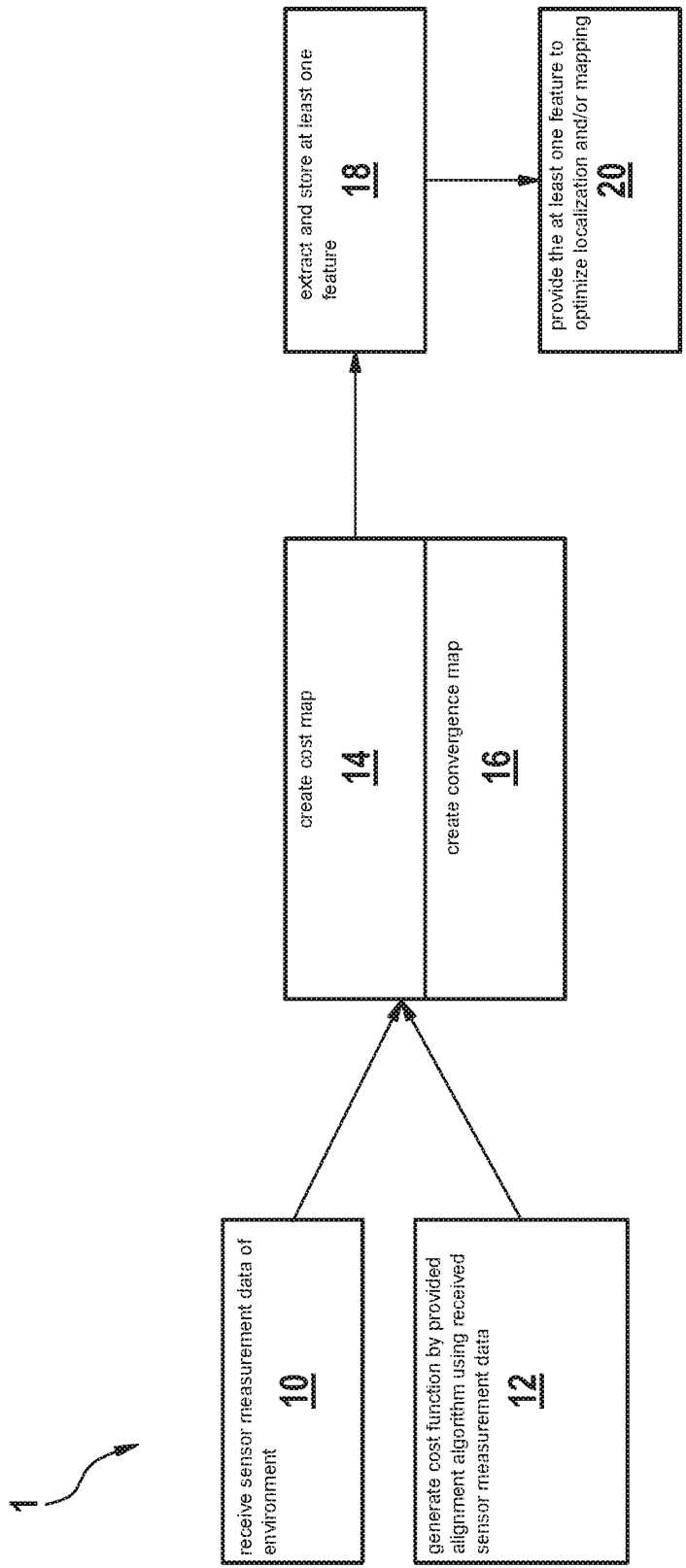
FIG. 1 shows a schematic flow chart to illustrate the method according to one specific embodiment of the present invention.
Figure 4:
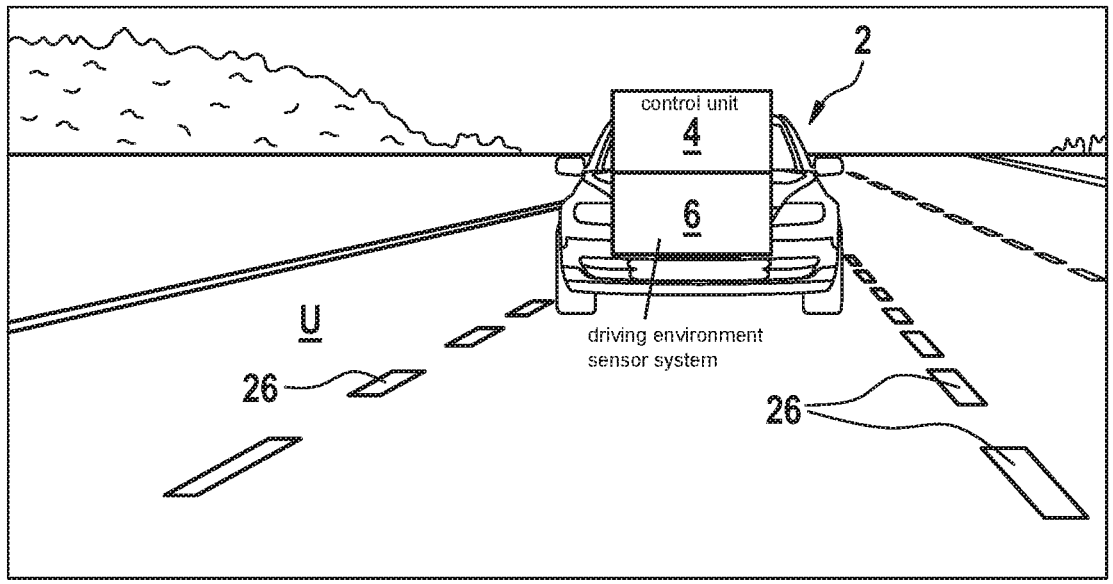
FIG. 4 shows schematic representations of an environment of a mobile unit for illustrating repeating features in accordance with an example embodiment of the present invention.
Figure 4:
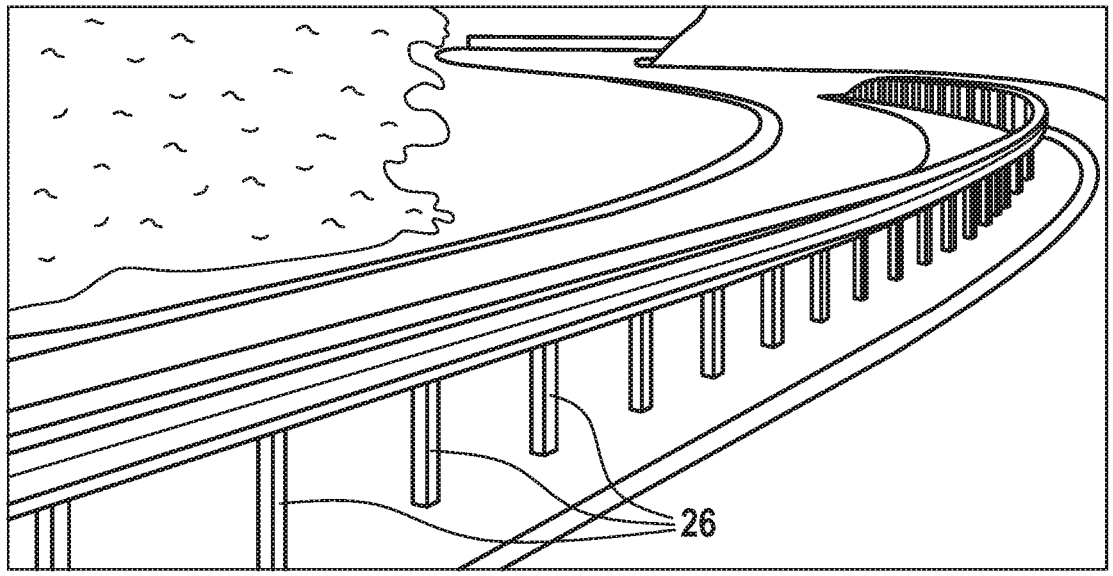

FIG. 1 shows a schematic flow chart to illustrate method 1 according to one specific embodiment of the present invention. Method 1 is used to ascertain features in an environment U of at least one mobile unit 2, for implementation of a localization and/or mapping by a control unit 4. Mobile unit 2 has control unit 4, takes the form of a vehicle operable in automated fashion, and is shown in FIG. 4.

In a first step 10 of method 1, sensor measurement data of environment U are received. For example, the sensor measurement data may be ascertained by a driving-environment sensor system 6, and received and evaluated by control unit 4. Alternatively, already existing map data may be called up.

In a further step 12, an alignment algorithm is provided and a cost function is generated by the alignment algorithm with the aid of the received sensor measurement data.

A cost map 14 is then created based on the alignment algorithm and the cost function. In a further step, a convergence map 16 is created based on the alignment algorithm.

In a further step, at least one feature is extracted from cost map 14 and/or convergence map 16 and stored 18.

The at least one feature is subsequently provided 20 in order to optimize a localization and/or mapping.

Figure 2:
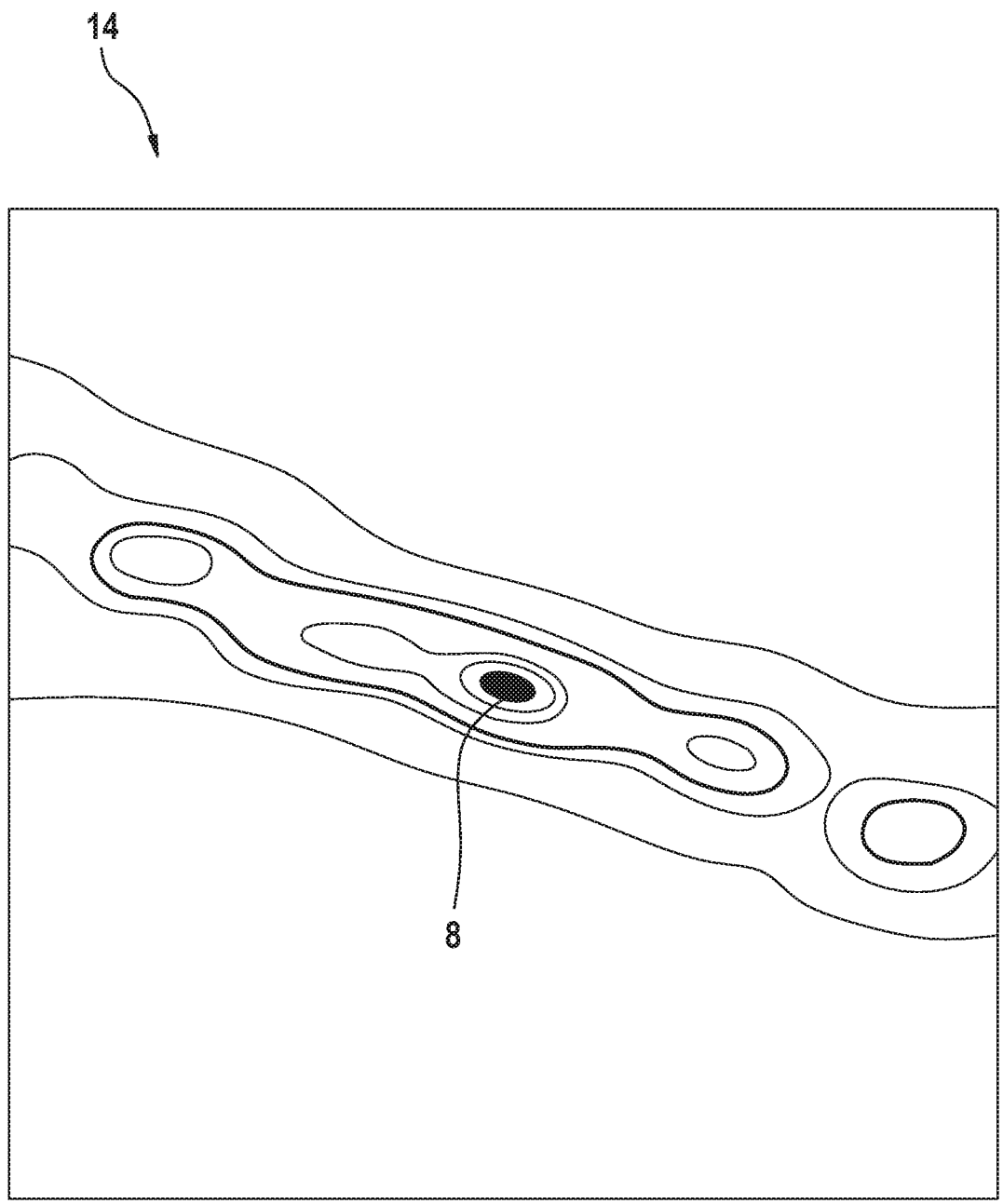
FIG. 2 shows an exemplary representation of a cost map with a minimum in accordance with an example embodiment of the present invention.

FIG. 2 shows an exemplary representation of a cost map 14 having one local minimum 8. Minimum 8 has a least value, so that mobile unit 2 is able to travel in the area of minimum 8 without danger of collision.

Figure 3:
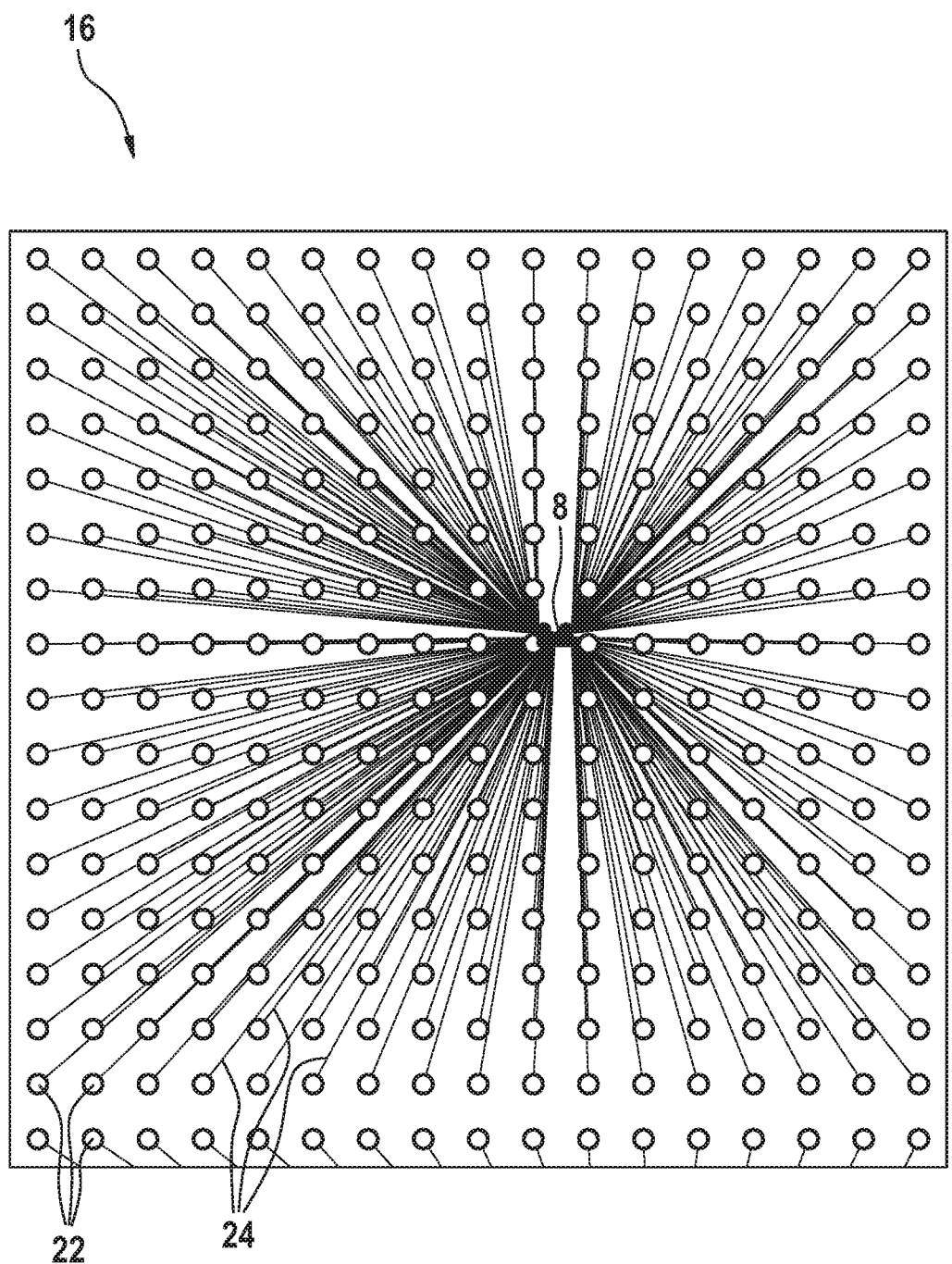
FIG. 3 shows an exemplary representation of a convergence map with a minimum in accordance with an example embodiment of the present invention.

FIG. 3 shows an exemplary representation of a convergence map 16 having one minimum 8, which corresponds to an alignment algorithm employed for creating cost map 14 shown in FIG. 2. Points 22 show the starting points for the iteration points. The lines or trajectories 24 correspond to the directions in which respective points 22 converge. The efficiency of alignment algorithms may be illustrated by the use of convergence map 16.

FIG. 4 shows schematic representations of an environment U of a mobile unit 2 for illustrating repeating features 26. For example, repeating features 26 may be lane markings or guardrail supports.

As an example, mobile unit 2 takes the form of a vehicle and has a control unit 4. Control unit 4 is connected to a driving-environment sensor system 6 in a manner allowing the transfer of data. Control unit 4 is thereby able to receive sensor measurement data from driving-environment sensor system 6.

For example, driving-environment sensor system 6 may have camera sensors, radar sensors, LIDAR sensors, ultrasonic sensors and the like, and may provide the ascertained sensor measurement data in analog or digital form to control unit 4.

Figure 5:
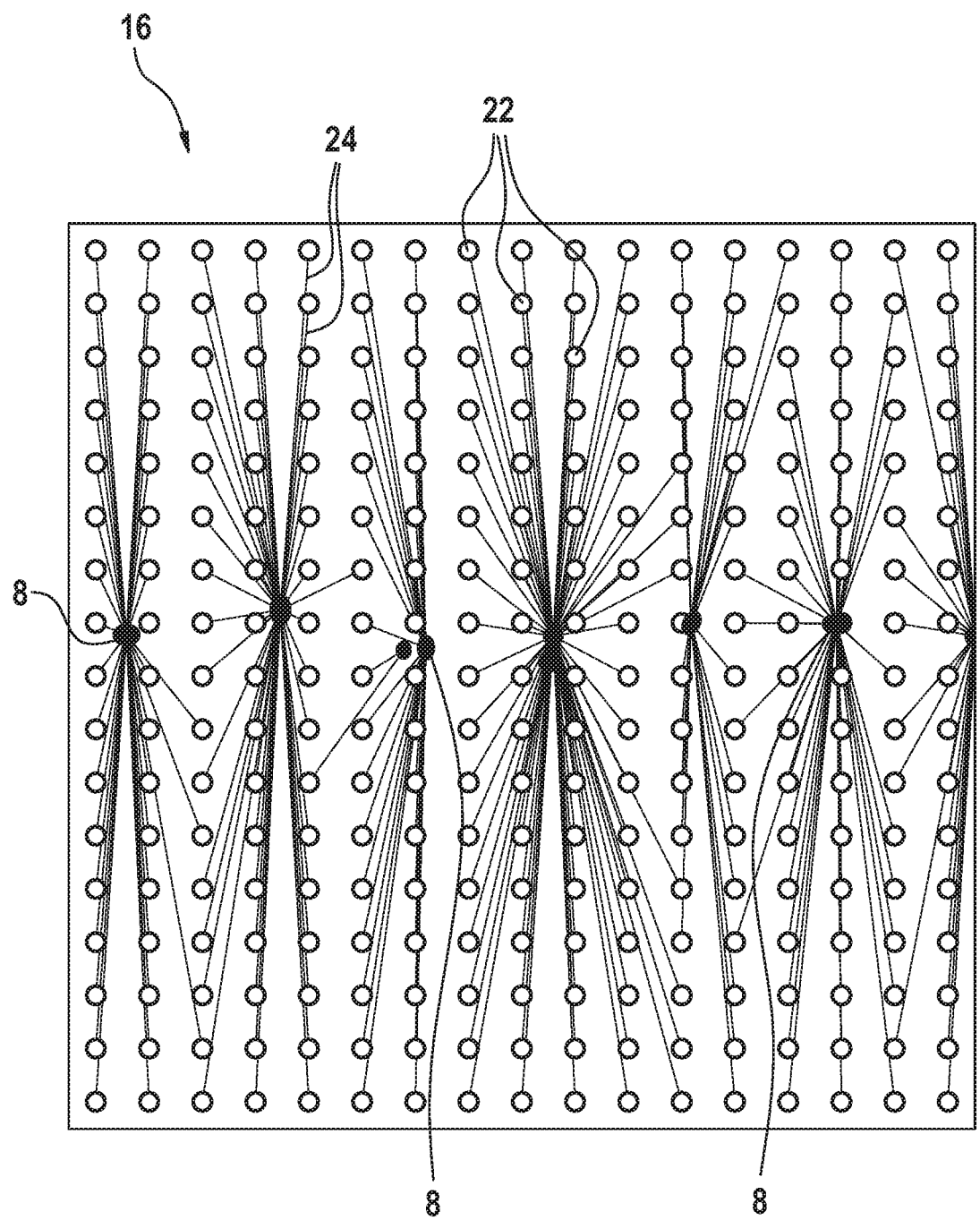
FIG. 5 shows a schematic convergence map which reflects repeating features in accordance with an example embodiment of the present invention.

Corresponding to repeating features 24, FIG. 5 shows a schematic convergence map 16 which reflects repeating features 26. The number of minima 8 gives information here about the uniqueness of features 26. Unique features 25 lead to a single minimum 8. Periodically occurring features 26 lead to a plurality of local minima 8. This relationship is illustrated in FIGS. 6 through 9.

Figure 7:
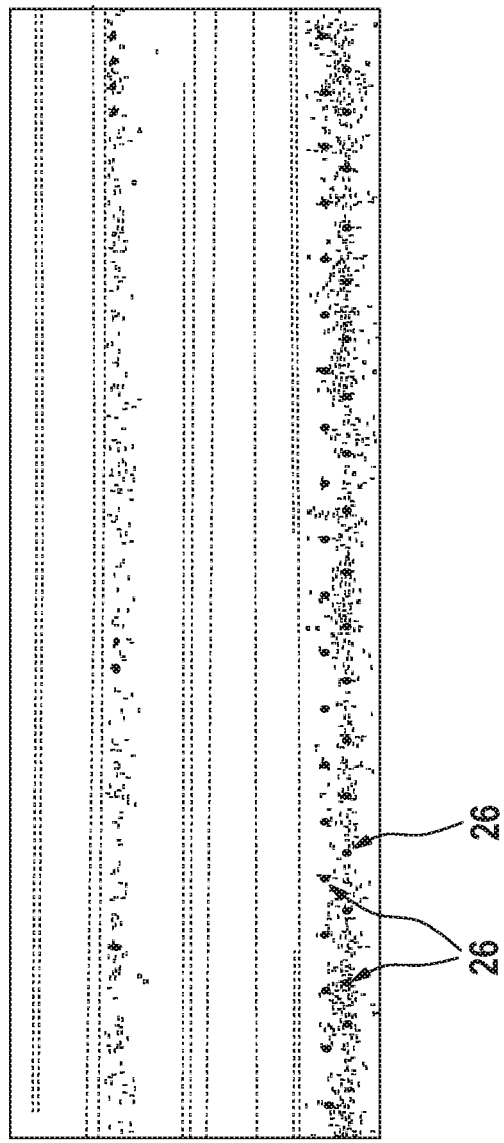
FIG. 7 shows schematic representation of sensor measurement data of a radar sensor which are used to create the convergence map in FIG. 6 in accordance with an example embodiment of the present invention.
Figure 6:
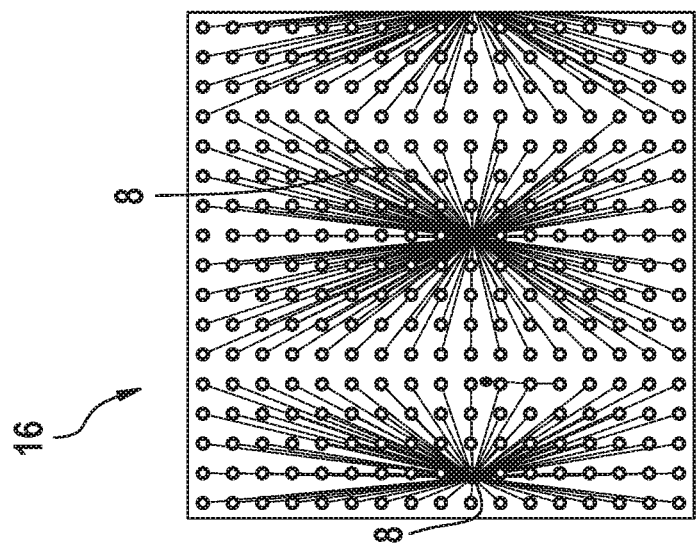
FIG. 6 shows a further schematic convergence map which reflects repeating features in accordance with an example embodiment of the present invention.

FIG. 7 and FIG. 9 show sensor measurement data of a radar sensor. FIG. 7 shows sensor measurement data of a turnpike section having a large number of reflector posts as repeating features 26. FIG. 6 illustrates a convergence map 16 corresponding to that and having a plurality of minima 8.

FIG. 9 shows sensor measurement data of a radar sensor of a turnpike exit. The turnpike exit represents a unique feature 25 occurring one time. Resulting convergence map 16 is shown in FIG. 8 and has a single minimum 8. The uniqueness of respective features 25, 26 may thus be inferred based on the number of minima 8.

What is claimed is:

1. A method for implementation of a localization and/or mapping by a control unit, the method comprising the following steps:
    receiving sensor measurement data of an environment of a mobile unit;
    using an alignment algorithm to generate:
        a cost map by applying the received sensor measurement data to a cost function; and/or
        a convergence map;
    ascertaining, based on how many minima are present in the cost map or the convergence map, whether a sensed feature represented in the cost map or the convergence map is a repeating feature within the environment or a non-repeating feature within the environment; and
    based on a result of the ascertainment:
        storing the feature; and
        providing the feature to optimize the localization and/or the mapping.

2. The method as recited in claim 1, wherein, in the ascertaining step, the sensed feature is ascertained to be non-repeating conditional upon that a number of the minima corresponding to the feature that is determined to be present in the cost map or the convergence map is not more than one.

3. The method as recited in claim 1, wherein the cost function is utilized to generate the cost map, the cost map is a two-dimensional or three-dimensional cost map, and the ascertaining is performed using the cost map.

4. The method as recited in claim 1, wherein a sharpness and/or a form of a minimum is determined in the cost map and utilized for processing the sensor measurement data.

5. The method as recited in claim 1, wherein differences are determined between the minima in the cost map.

6. A control unit configured for implementation of a localization and/or mapping, the control unit comprising a processor, wherein the processor is configured to:
    receive sensor measurement data of an environment of a mobile unit;
    use an alignment algorithm to generate:
        a cost map by applying the received sensor measurement data to a cost function; and/or
        a convergence map;
    ascertain, based on how many minima are present in the cost map or the convergence map, whether a sensed feature represented in the cost map or the convergence map is a repeating feature within the environment or a non-repeating feature within the environment and based on a result of the ascertainment:
        store the feature; and
        provide the feature to optimize the localization and/or the mapping.

7. A non-transitory machine-readable storage medium on which is stored a computer program for implementation of a localization and/or mapping, the computer program, when executed by a computer, causing the computer to perform the following steps:
    receiving sensor measurement data of an environment of a mobile unit;
    using an alignment algorithm to generate:
        a cost map by applying the received sensor measurement data to a using the cost function; and/or generating
        a convergence map;
    ascertaining, based on how many minima are present in the cost map or the convergence map, whether a sensed feature represented in the cost map or the convergence map is a repeating feature within the environment or a non-repeating feature within the environment and based on a result of the ascertainment:
        storing the feature; and
        providing the feature to optimize the localization and/or the mapping.

* * * * *